(12) United States Patent
Tang et al.

(10) Patent No.: US 8,634,332 B2
(45) Date of Patent: Jan. 21, 2014

(54) USING JOINT DECODING ENGINE IN A WIRELESS DEVICE

(75) Inventors: Jia Tang, Campbell, CA (US); Atul A. Salvekar, Emeryville, CA (US); Jonathan Sidi, Mountain View, CA (US); Jong Hyeon Park, San Jose, CA (US); Subramanya P. Rao, Cupertino, CA (US); Abhinav Gupta, San Jose, CA (US); Shantanu Khare, Chicago, IL (US); Gokhan Mergen, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 489 days.

(21) Appl. No.: 12/769,916

(22) Filed: Apr. 29, 2010

(65) Prior Publication Data

US 2011/0268019 A1 Nov. 3, 2011

(51) Int. Cl.
*H04B 7/00* (2006.01)
*H04B 7/185* (2006.01)

(52) U.S. Cl.
USPC ............................................. 370/277; 370/317

(58) Field of Classification Search
None
See application file for complete search history.

(56) References Cited

U.S. PATENT DOCUMENTS

| | | | |
|---|---|---|---|
| 7,248,647 B2 | 7/2007 | Claussen et al. | |
| 2003/0103584 A1 | 6/2003 | Bjerke et al. | |
| 2007/0223358 A1* | 9/2007 | Visoz et al. | 370/201 |
| 2008/0219374 A1 | 9/2008 | Fernandez-Corbaton et al. | |
| 2008/0225974 A1 | 9/2008 | Prasad et al. | |
| 2008/0310554 A1 | 12/2008 | Siti et al. | |
| 2009/0016425 A1* | 1/2009 | Hui et al. | 375/240 |
| 2009/0052593 A1 | 2/2009 | Bahng et al. | |
| 2009/0172502 A1* | 7/2009 | Lin et al. | 714/792 |
| 2009/0213945 A1* | 8/2009 | Cairns et al. | 375/260 |
| 2010/0271988 A1* | 10/2010 | Jia et al. | 370/280 |
| 2011/0013684 A1* | 1/2011 | Semenov et al. | 375/232 |
| 2011/0051831 A1 | 3/2011 | Subrahmanya et al. | |
| 2011/0211657 A1* | 9/2011 | Cho et al. | 375/299 |

FOREIGN PATENT DOCUMENTS

| | | |
|---|---|---|
| JP | 2010504662 A | 2/2010 |
| WO | 2009111400 A1 | 9/2009 |
| WO | 2011024129 A2 | 3/2011 |

OTHER PUBLICATIONS

International Search Report and Written Opinion—PCT/US2011/034140, International Search Authority—European Patent Office—Sep. 21, 2011.

* cited by examiner

*Primary Examiner* — Eunsook Choi
(74) *Attorney, Agent, or Firm* — S. Hossain Beladi

(57) ABSTRACT

A method for using a joint decoding engine in a wireless device is disclosed. A first symbol stream and a second symbol stream in a received multiple input multiple output (MIMO) signal is determined. A scaled channel estimate for a wireless transmission channel and a scaled noise covariance of the MIMO signal are also determined. The scaled channel estimate and the first symbol stream are whitened. Max log maximum a posteriori (MLM) processing is performed on the whitened first symbol stream to produce a first data stream. The first data stream may be de-rate matched and decoded to produce a decoded first data stream.

26 Claims, 9 Drawing Sheets

USING JOINT DECODING ENGINE IN A WIRELESS DEVICE

TECHNICAL FIELD

The present disclosure relates generally to communication systems. More specifically, the present disclosure relates to using a joint decoding engine in a wireless device.

BACKGROUND

Wireless communication systems have become an important means by which many people worldwide have come to communicate. A wireless communication system may provide communication for a number of wireless communication devices, each of which may be serviced by a base station. A wireless communication device may be capable of using multiple protocols and operating at multiple frequencies to communicate in multiple wireless communication systems.

As wireless communication becomes more popular, different signal processing techniques may be used to increase the quality and efficiency of wireless communication devices. However, the techniques themselves may present new challenges, such as adding computational complexity within a wireless communication device. These techniques may be optimizations for required, existing processes or new processes. One process within modern devices that may consume device resources is decoding a wireless signal. Therefore, benefits may be realized by improved systems and methods for using a joint decoding engine in a wireless device.

DETAILED DESCRIPTION

Figure 1:
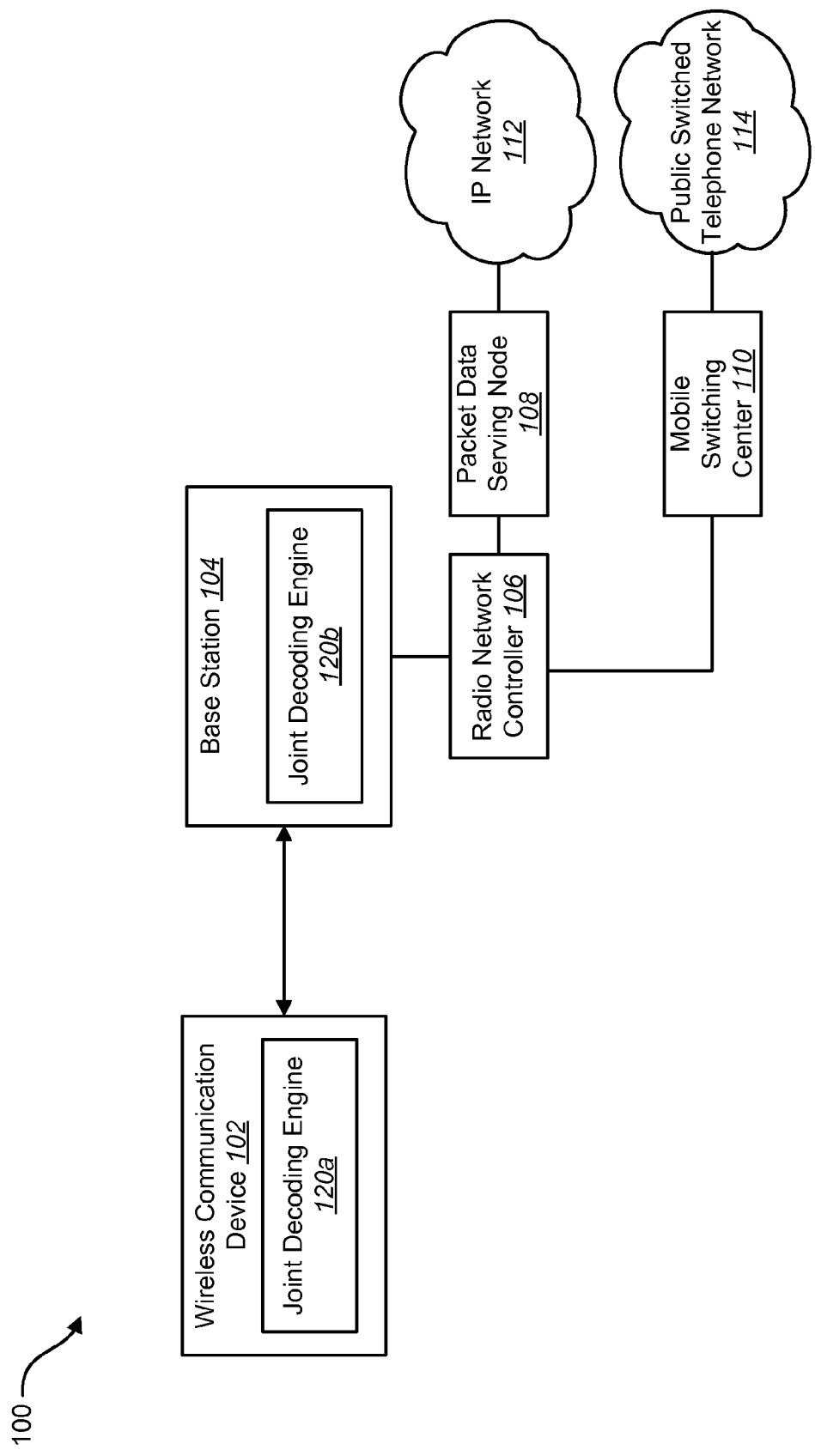
FIG. 1 is a block diagram illustrating a wireless communication system with a wireless communication device that uses a joint decoding engine.

A method for using a joint decoding engine in a wireless device is disclosed. A first symbol stream and a second symbol stream in a received multiple input multiple output (MIMO) signal is determined. A scaled channel estimate for a wireless transmission channel and a scaled noise covariance of the MIMO signal are also determined. The scaled channel estimate and the first symbol stream are whitened. Max log maximum a posteriori (MLM) processing is performed on the whitened first symbol stream to produce a first data stream. The first data stream may be de-rate matched and decoded to produce a decoded first data stream.

In one configuration, hard successive interference cancellation (SIC) or soft SIC may be performed on the second symbol stream if SIC is enabled. The second symbol stream may be whitened, have MLM processing performed, be de-rate matched, and turbo decoded to produce a decoded second data stream. SIC may include encoding the decoded first data stream to reproduce the first data stream and using the first data stream to zero out one column of the scaled channel estimate.

Furthermore, scaling factors for a channel estimate and a noise covariance in the received MIMO signal may be determined based on amplitude and energy of the first symbol stream and the second symbol stream. The channel estimate and the noise covariance may be scaled using the scaling factors to produce the scaled channel estimate and the scaled noise covariance. The determining of the first symbol stream and the second symbol stream from the received MIMO signal may include dispreading or descrambling the received MIMO signal to produce the first symbol stream and the second symbol stream. The whitening may include determining a whitening matrix based on the scaled noise covariance of the MIMO signal and whitening the scaled channel estimate and the first symbol stream using the whitening matrix.

In one configuration, MLM processing includes performing the following actions if bit $b_k$ is in $s_1$, where $s_1$ is a symbol in the first symbol stream. Possible $s_1$ values may be determined as constellation points such that $b_k=1$. For each possible $s_1$ value, a minimum mean square error (MMSE) estimate of a corresponding $s_2$ may be determined, where $s_2$ is a symbol in the second symbol stream and determining possible $s_2$ values as the MMSE estimates of $s_2$ sliced to a nearest constellation point. The value $d_1=\|y-h_1s_1-h_2s_2\|$ may be estimated using an L2 norm max sum approximation for each ($s_1$, $s_2$) pair, where y is the received multiple input multiple output (MIMO) signal, $h_1$ is a first column in the scaled channel estimate, and $h_2$ is a second column in the scaled channel estimate. A minimum $d_1$ value, $\min(d_1)$, may be determined. Possible $s_1$ values may be determined as constellation points such that $b_k=0$. For each possible $s_1$ value, an MMSE estimate of a corresponding $s_2$ may be obtained and possible $s_2$ values may be determined as the MMSE estimates of $s_2$ sliced to a nearest constellation point. The value $d_0=\|y-h_1s_1-h_2s_2\|$ may be estimated using an L2 norm max sum approximation for each ($s_1$, $s_2$) pair. A minimum do value, $\min(d_0)$, may be determined. The log likelihood ratio (LLR) of $b_k$, $L(b_k)$, as $L(b_k)=(\min(d_1))^2-(\min(d_0))^2$ may be determined.

However, if bit $b_k$ is in $s_2$, the following actions may be performed. Possible $s_2$ values may be determined as constellation points such that $b_k=1$. For each possible $s_2$ value, a minimum mean square error (MMSE) estimate of a corresponding $s_1$ may be obtained and possible $s_1$ values may be determined as the MMSE estimates of $s_1$ sliced to a nearest constellation point. The value $d_1=\|y-h_1s_1-h_2s_2\|$ may be estimated using an L2 norm max sum approximation for each ($s_1$, $s_2$) pair. A minimum $d_1$ value, $\min(d_1)$, may be determined. Possible $s_2$ values may be determined as constellation points such that $b_k=0$. For each possible $s_2$ value, an MMSE estimate of a corresponding $s_1$ may be obtained and possible $s_1$ values may be determined as the MMSE estimates of $s_1$ sliced to a nearest constellation point. The value $d_0=\|y-h_1s_1-h_2s_2\|$ may be estimated using an L2 norm max sum approximation for each ($s_1$, $s_2$) pair. A minimum $d_0$ value, $\min(d_0)$, may be determined. The log likelihood ratio (LLR) of $b_k$, $L(b_k)$, as $L(b_k)=(\min(d_1))^2-(\min(d_0))^2$ may be determined.

The estimating of $d_1$ and $d_0$ using the L2 norm max sum approximation may include defining $$z = \begin{bmatrix} z_1 \\ z_2 \\ z_3 \\ z_4 \end{bmatrix} = \begin{bmatrix} \text{real}(s_1) \\ \text{imag}(s_1) \\ \text{real}(s_2) \\ \text{imag}(s_2) \end{bmatrix}$$

and determining d as $$d = \max_i |z_i| + 0.25 \left( \sum_{j \neq i} |z_j| \right)$$

where i and j are incrementing indices. The wireless device may operate using High Speed Downlink Packet Access (HS-DPA).

An apparatus that uses a joint decoding engine is also disclosed. The apparatus includes a processor and memory in electronic communication with the processor. Executable instructions are stored in the memory. The instructions are executable to determine a first symbol stream and a second symbol stream in a received multiple input multiple output (MIMO) signal, a scaled channel estimate for a wireless transmission channel, and a scaled noise covariance of the MIMO signal. The instructions are also executable to whiten the scaled channel estimate and the first symbol stream. The instructions are also executable to perform max log maximum a posteriori (MLM) processing on the whitened first symbol stream to produce a first data stream. The instructions are also executable to de-rate match and turbo decode the first data stream to produce a decoded first data stream.

A wireless device that uses a joint decoding engine is also disclosed. The wireless device includes means for determining a first symbol stream and a second symbol stream in a received multiple input multiple output (MIMO) signal, a scaled channel estimate for a wireless transmission channel, and a scaled noise covariance of the MIMO signal. The wireless device also includes means for whitening the scaled channel estimate and the first symbol stream. The wireless device also includes means for performing max log maximum a posteriori (MLM) processing on the whitened first symbol stream to produce a first data stream. The wireless device also includes means for de-rate matching and turbo decoding the first data stream to produce a decoded first data stream.

A computer-program product for using a joint decoding engine is also disclosed. The computer-program product includes a computer-readable medium having instructions thereon. The instructions include code for determining a first symbol stream and a second symbol stream in a received multiple input multiple output (MIMO) signal, a scaled channel estimate for a wireless transmission channel, and a scaled noise covariance of the MIMO signal. The instructions also include code for whitening the scaled channel estimate and the first symbol stream. The instructions also include code for performing max log maximum a posteriori (MLM) processing on the whitened first symbol stream to produce a first data stream. The instructions also include code for de-rate matching and turbo decoding the first data stream to produce a decoded first data stream.

FIG. 1 is a block diagram illustrating a wireless communication system 100 that uses a joint decoding engine 120. The wireless communication device 102 may communicate with a base station 104. Examples of a wireless communication device 102 include cellular phones, personal digital assistants (PDAs), handheld devices, wireless modems, laptop computers, personal computers, etc. A wireless communication device 102 may alternatively be referred to as an access terminal, a mobile terminal, a mobile station, a remote station, a user terminal, a terminal, a subscriber unit, a mobile device, a wireless device, a subscriber station, user equipment, or some other similar terminology. The base station 104 may alternatively be referred to as an access point, a Node B, an evolved Node B, or some other similar terminology.

The base station 104 may communicate with a radio network controller 106 (also referred to as a base station controller or packet control function). The radio network controller 106 may communicate with a mobile switching center (MSC) 110, a packet data serving node (PDSN) 108 or internetworking function (IWF), a public switched telephone network (PSTN) 114 (typically a telephone company), and an Internet Protocol (IP) network 112 (typically the Internet). The mobile switching center 110 may be responsible for managing the communication between the wireless communication device 102 and the public switched telephone network 114, while the packet data serving node 108 may be responsible for routing packets between the wireless communication device 102 and the IP network 112.

The wireless communication system may operate using High Speed Downlink Packet Access (HSDPA). The wireless communication device 102 may include a joint decoding engine 120a and the bases station 104 may include a joint decoding engine 120b. The joint decoding engines 120 may use joint decoding instead of symbol equalization to decode a symbol stream. Joint decoding of a multiple input multiple output (MIMO) data stream may provide significant improvement over symbol equalization. There are several joint decoding methods. One method is the full joint log likelihood ratio (JLLR) and another is max log maximum a posteriori (MAP), or MLM. The joint decoding engine 120 may include both hard/soft successive interference cancellation (SIC) and non-SIC.

The max log MAP/joint log likelihood ratio (MLM/JLLR) core of the joint decoding engines 120 may process raw received symbols that include inter-channel interference (ICI) and inter-symbol interference (ISI). The inter-channel interference (ICI) may be measured in the noise covariance and the inter-symbol interference (ISI) may be measured by calculating a channel matrix. Furthermore, the noise covariance and channel matrix, or the noise whitened equivalents, may be fed into the MLM/JLLR core for processing. Thus, the present systems and methods include channel matrix calculation, noise covariance, noise whitening of data, computation of LLRs, subsequent post-processing, e.g., turbo decoding or hard/soft successive interference cancellation (SIC).

Figure 2:
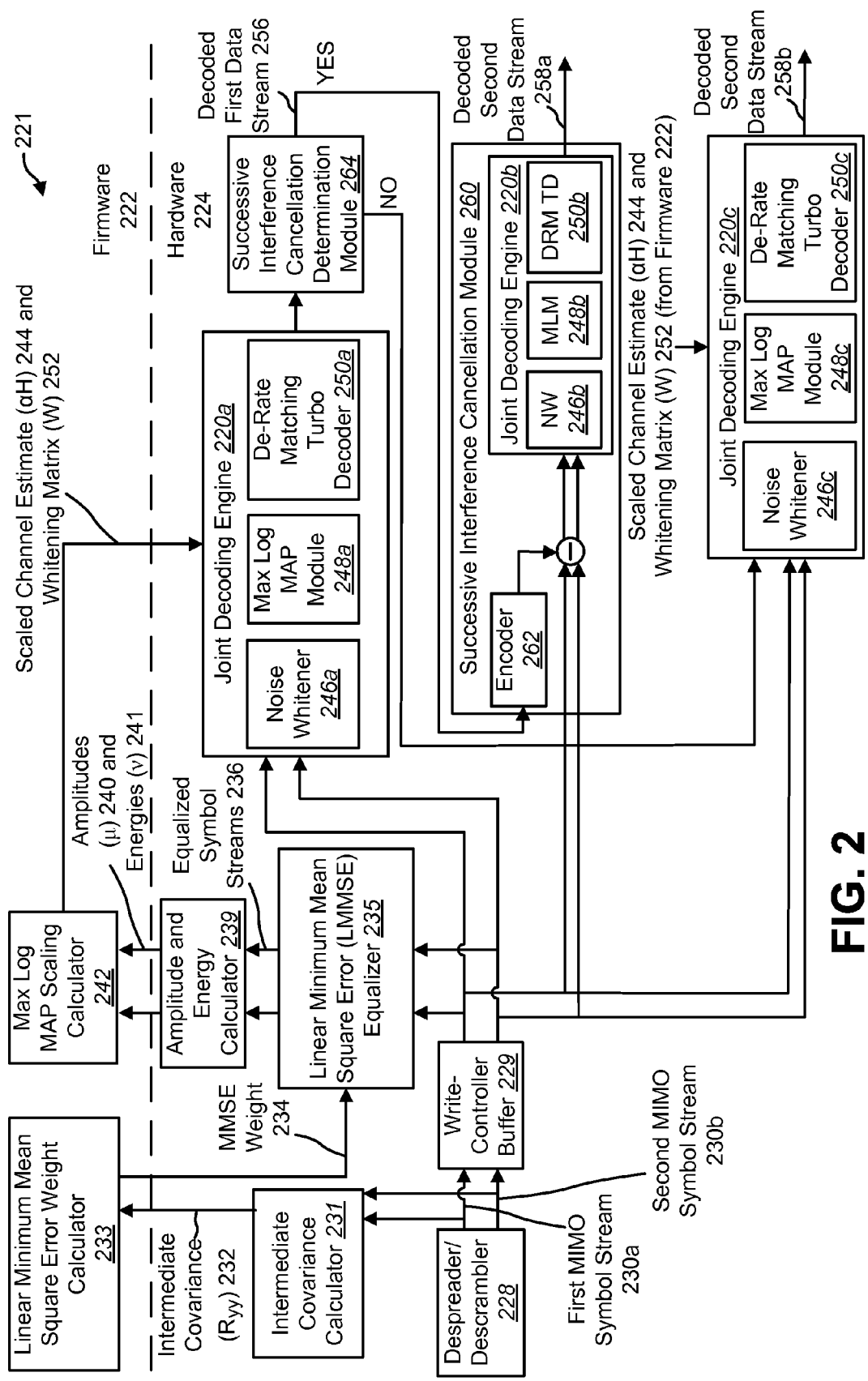
FIG. 2 is a block diagram illustrating a joint decoding engine in a MIMO data path.

FIG. 2 is a block diagram illustrating a joint decoding engine 220 in a MIMO data path 221. The MIMO data path 221 may be in a wireless communication device 102 or a base station 104. The illustrated MIMO data path 221 may include firmware 222 and hardware 224, although any combination of software and hardware may be used to implement the described functions. For example, the illustrated hardware 224 portion of the MIMO data path 221 may be in the demodulator of a wireless communication device 102.

A chip level MIMO signal may be received by a despreader/descrambler 228 that converts the chip level MIMO signal into a first MIMO symbol stream 230a and a second MIMO symbol stream 230b. A write-controller buffer 229 may store the MIMO symbol streams 230. A received symbol (y) in the write-controller buffer 229 may be described according to Equation (1):

$$y = Hs + n = \begin{bmatrix} h_{11} & h_{12} \\ h_{21} & h_{22} \end{bmatrix} \begin{bmatrix} s_1 \\ s_2 \end{bmatrix} + \begin{bmatrix} n_1 \\ n_2 \end{bmatrix} \quad (1)$$

where y is the received symbol, H is a channel estimate, $$s = \begin{bmatrix} s_1 \\ s_2 \end{bmatrix}$$

are two streams of the transmitted symbol, and n is the noise on the received signal. The two streams of the transmitted symbol, $s_1$ and $s_2$, may use different modulation techniques, e.g., Quadrature Phase Shift Keying (QPSK), 16 Quadrature Amplitude Modulation (16QAM), 64 Quadrature Amplitude Modulation (64QAM), etc.

The MIMO symbol streams 230 may be used by an intermediate covariance calculator 231 to determine an intermediate covariance (Ryy) 232 that may be used as input to a linear minimum mean square error (LMMSE) weight calculator 233. The LMMSE weight calculator 233 may output an MMSE weight 234. A linear minimum mean square error (LMMSE) equalizer 235 may apply the MMSE weight 234 to the data streams to output two equalized symbol streams 236. Furthermore, equalized symbol streams 236 and an amplitude (µ) 240 and energy (v) 241, may be used by a max log MAP (MLM) scaling calculator 242 to determine scaling parameters for a channel estimate and a noise covariance. The amplitude (µ) 240 and energy (v) 241 may be calculated by the amplitude and energy calculator 239. The scaled noise covariance may be used to determine a whitening matrix (W) 252.

In HSDPA, the carrier-to-interference ratio (CIR) matrix (H) and noise covariance matrix ($R_{nn}$) may be estimated via the Common Pilot Channel (CPICH) that may have an unknown power offset to the High Speed-Physical Downlink Shared Channel (HS-PDSCH). Taking into account this unknown scaling, the MIMO symbol stream 230 may be described according to Equation (2):

$$y = \alpha Hs + \sqrt{\beta} R_{nn}^{1/2} n \quad (2)$$

where α and β are unknown scaling parameters that are calculated in the max log MAP (MLM) scaling calculator 242.

One possible approach to decoding multiple MIMO symbol streams 230 may be to use a symbol equalizer followed by log likelihood ratio (LLR) approximation. In contrast, the joint decoding engines 220a-c may use noise whitening, max log MAP (MLM) processing, and turbo decoding. Therefore a joint decoding engine 220a may include a noise whitener 246a, a max log MAP (MLM) module 248a, and a de-rate matching turbo decoder 250a. The joint decoding engine 220a may receive a scaled channel estimate (αH) 244, a whitening matrix (W) 252, and the MIMO symbol streams 230 and produce a decoded first data stream 256 as output. The whitening matrix (W) 252 may be calculated in the firmware 222 according to equation (3):

$$W = (\beta R_{nn})^{-1/2} \quad (3)$$

The noise whitener 246a may whiten the received symbol according to Equation (4):

$$Y_w = W^* y \quad (4)$$

where $Y_w$ is the whitened received symbol. The noise whitener 246a may also whiten the scaled channel estimate 244 according to Equation (5):

$$H_w = W^*(\alpha H) \quad (5)$$

where $H_w$ is the whitened channel estimate.

Therefore, the output of the noise whitener 246a may be a whitened channel estimate ($H_w$) and the whitened received symbols ($Y_w$). The max log MAP (MLM) module 248a may then perform max log MAP (MLM) processing to produce a first data stream. Even though the max log MAP (MLM) module 248a may be capable of producing the first data stream based on the first MIMO symbol stream 230a and a second data stream based on the second MIMO symbol stream 230b, the max log MAP (MLM) module 248a may produce only the first data stream because the joint decoding engines 220 may include only one de-rate matching turbo decoder 250a. The de-rate matching turbo decoder 250a may then de-rate match and decode the first data stream to produce a decoded first data stream 256. De-rate matching may be performed to undo the rate matching performed at the time of encoding. In other words, rate matching at a transmitter may change the code rate in a data stream by puncturing/removing or expanding/repeating bits in the data stream before transmitting. Conversely, the de-rate matching may de-puncture, or replace, some of the bits in the data stream before turbo decoding. This allows the turbo decoder to receive a data stream at the expected data rate. Therefore, a first joint decoding engine 220a may produce a decoded first data stream 256. A successive interference cancellation (SIC) determination module 264 may determine if a hard-SIC feature or a soft-SIC feature is enabled in the MIMO data path 221 and if the decoded first data stream 256 passes a cyclic redundancy check (CRC).

There may be three configurations for producing the decoded second stream 258. In a first configuration, when a hard-SIC feature is enabled and the decoded first data stream 256 passes the CRC, a successive interference cancellation module 260 may use hard-SIC to decode the second data stream. In a second configuration, if a soft-SIC feature is enabled, whether or not the decoded first data stream 256 passes the CRC, the successive interference cancellation module 260 may use soft-SIC to decode the second data stream. In a third configuration, if the hard-SIC feature is enabled but the decoded first data stream 256 fails the CRC, the second data stream may be decoded the same way as the first data stream.

If hard-SIC is enabled and the CRC is successful, or if soft-SIC is enabled, a successive interference cancellation (SIC) module 260 may receive the decoded first data stream 256 as input and produce the decoded second data stream 258a using SIC. If hard-SIC is used, the decoded second data stream 258a may include hard values. However, if soft-SIC is used, the decoded second data stream 258a may include soft values, i.e., values that indicate reliability of the data. SIC may be conducted to subtract a re-encoded version of the decoded first data stream 256 from the second MIMO symbol stream 230b. If SIC is used, the signal model, from Equation (1), may be written as shown in Equation (6):

$$y = h_1 s_1 + h_2 s_2 + n \quad (6)$$

where $h_1$ is the first column of the scaled channel estimate (αH) 244 and $h_2$ is the second column of the scaled channel estimate (αH) 244. The successive interference cancellation module 260 may cancel the decoded first data stream 256, $s_1$, from the signal, assuming the decoded first data stream 256, $s_1$, has been decoded first and cancelled out. In other words, the successive interference cancellation module 260 may isolate the second data stream, as shown in Equation (7), before decoding the second stream.

$$y_2 = h_2 s_2 + n \quad (7)$$

Therefore, the input to the joint decoding engine 220b used for SIC may be according to Equation (8):

$$y_2 = \begin{bmatrix} 0 & h_{12} \\ 0 & h_{22} \end{bmatrix} \begin{bmatrix} s_1 \\ s_2 \end{bmatrix} + \begin{bmatrix} n_1 \\ n_2 \end{bmatrix} \quad (8)$$

In other words, an encoder 262 may re-encode the decoded first data stream 256 so that one column of the scaled channel estimate (αH) 244 may be zeroed out. The partially zeroed out scaled channel estimate (αH) 244 may be fed into the joint decoding engine 220b and processed by a noise whitener 246b, a max log MAP (MLM) module 248b, and a de-rate matching turbo decoder 250b to produce the decoded second data stream 258a.

If however, either SIC (hard or soft) is not enabled or the CRC is not successful, a third joint decoding engine 220c may produce a decoded second data stream 258b using a noise whitener 246c, a max log MAP (MLM) module 248c, and a de-rate matching turbo decoder 250c as described above. The third joint decoding engine 220c, like the first joint decoding engine 220a, may receive the scaled channel estimate (αH) 244 and the whitening matrix (W) 252, e.g., from the firmware 222.

Figure 3:
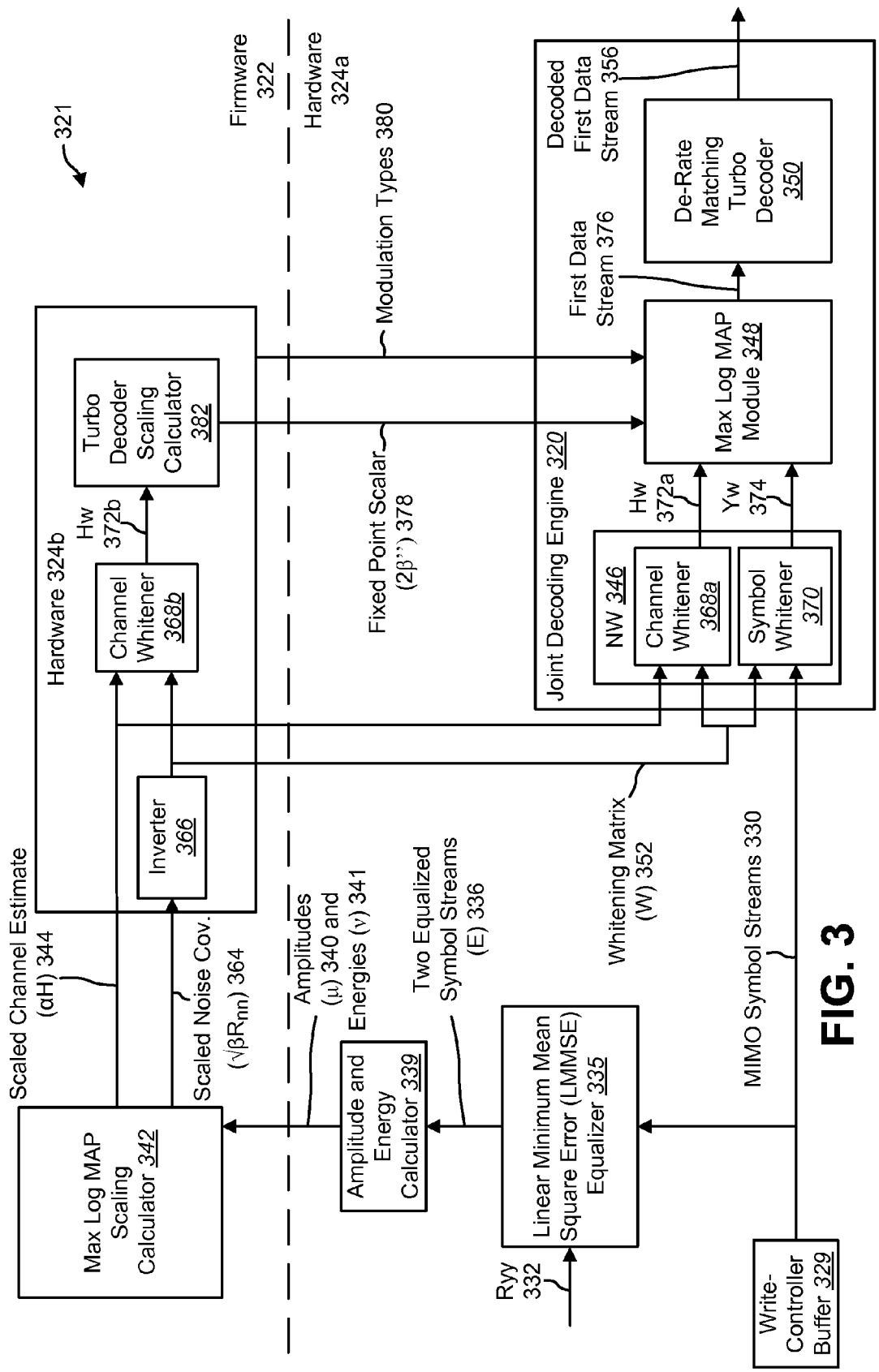
FIG. 3 is a block diagram illustrating scaling calculations for a joint decoding engine.

FIG. 3 is a block diagram illustrating scaling calculations for a joint decoding engine 320. As before, a MIMO data path 321 may be in a wireless communication device 102 or a base station 104. The illustrated MIMO data path 321 may include firmware 322 and hardware 324a-b, although any combination of software and hardware may be used to implement the described functions. For example, the illustrated hardware 324 portion of the MIMO data path 321 may be in the demodulator of a wireless communication device 102.

A write-controller buffer 329 may store one or more MIMO symbol streams 330. A linear minimum mean square error (LMMSE) equalizer 335 may generate two equalized symbol streams (E) 336 as shown in Equation (9):

$$E = f_{scale}(H * R_{yy}^{-1}) \quad (9)$$

where $R_{yy}$ 332 is the intermediate covariance received from the LMMSE weight calculator 233, $e_i$ is the ith row of matrix E, and $f_{scale}(\bullet)$ is a scaling function that is used to control the bitwidth of the symbols. Note that in order to fit write-controller buffer 329 bitwidth of each stream, the scaling factor for the two streams may be different. The two separated streams may be expressed as shown in Equation (10):

$$r = Ey = \alpha EHs + \sqrt{\beta} ER_{nn}^{1/2} n \quad (10)$$

where H and $R_{nn}$ are unscaled. In the following description, A=EH and $$B = ER_{nn}^{1/2}.$$

Therefore, the streams may be expressed as shown in Equation (11):

$$\begin{bmatrix} r_1 \\ r_2 \end{bmatrix} = \begin{bmatrix} \alpha A_{1,1} s_1 \\ \alpha A_{2,2} s_2 \end{bmatrix} + \begin{bmatrix} \alpha A_{1,2} s_2 + \sqrt{\beta}(B_{1,1} n_1 + B_{1,2} n_2) \\ \alpha A_{2,1} s_1 + \sqrt{\beta}(B_{2,1} n_1 + B_{2,2} n_2) \end{bmatrix} \quad (11)$$

Following the LMMSE equalizer 335, the amplitude and energy calculator 339 may estimate the symbol amplitude (μ) 340 and energy (ν) 341. The received two MIMO symbol streams 330 may be expressed as shown in Equation (12):

$$\begin{bmatrix} r_1 \\ r_2 \end{bmatrix}_{real} = \begin{bmatrix} \mu_1 s_1 \\ \mu_2 s_2 \end{bmatrix}_{real} + \begin{bmatrix} \sigma_1 v_1 \\ \sigma_2 v_2 \end{bmatrix}_{real} \quad (12)$$

Comparing Equation (12) and Equation (11), the signal portion may be expressed as shown in Equation (13):

$$\begin{bmatrix} A_{1,1} \\ A_{2,2} \end{bmatrix} = \begin{bmatrix} \mu_1 \\ \mu_2 \end{bmatrix} \quad (13)$$

Thus, the least squares solution to the problem are expressed in Equation (14):

$$\alpha = \begin{bmatrix} A_{1,1} \\ A_{2,2} \end{bmatrix}^+ \begin{bmatrix} \mu_1 \\ \mu_2 \end{bmatrix} = \frac{1}{(A_{1,1}^2 + A_{2,2}^2)} [A_{1,1} \ A_{2,2}] \begin{bmatrix} \mu_1 \\ \mu_2 \end{bmatrix} \quad (14)$$

where $[\bullet]^+$ denotes the Moore-Penrose pseudo-inverse of the matrix. Similarly, the noise portion may be expressed according to Equation (15):

$$\begin{bmatrix} \alpha^2 |A_{1,2}|^2 E\{Re(s_2)^2\} \\ \alpha^2 |A_{2,1}|^2 E\{Re(s_1)^2\} \end{bmatrix} + \begin{bmatrix} |B_{1,1}|^2 + |B_{1,2}|^2 \\ |B_{2,1}|^2 + |B_{2,2}|^2 \end{bmatrix} \beta = \begin{bmatrix} 2\sigma_1^2 \\ 2\sigma_2^2 \end{bmatrix} \quad (15)$$

where E{•} indicates the expected value. Therefore, β may be calculated as shown in Equation (16):

$$\beta = \begin{bmatrix} |B_{1,1}|^2 + |B_{1,2}|^2 \\ |B_{2,1}|^2 + |B_{2,2}|^2 \end{bmatrix}^+ \begin{bmatrix} 2\sigma_1^2 - \alpha^2 |A_{1,2}|^2 E\{Re(s_2)^2\} \\ 2\sigma_2^2 - \alpha^2 |A_{2,1}|^2 E\{Re(s_1)^2\} \end{bmatrix} \quad (16)$$

Alternatively, β may be close to a fixed number, depending on the $f_{scale}(\bullet)$ algorithm (since the Common Pilot Channel (CPICH) and the High Speed-Physical Downlink Shared Channel (HS-PDSCH) may experience the same noise, the only difference may be the spreading gain of the two channels). In this case, β may not be calculated. However, α may always be calculated.

The max log MAP (MLM) scaling calculator 342 may then produce a scaled channel estimate (αH) 344 and a scaled noise covariance (β$R_{nn}$) 364 using the calculated α and β, respectively. An inverter 366 may then calculate a whitening matrix (W) 352 using the scaled noise covariance (β$R_{nn}$) 364 according to Equation (17):

$$W = (\beta R_{nn})^{-1/2} \quad (17)$$

A joint decoding engine 320 may receive the scaled channel estimate (αH) 344, the whitening matrix (W) 352 and the MIMO symbol streams 330 as input. A noise whitener 346 may include a channel whitener 368a and a symbol whitener 370. The channel whitener 368a may use the whitening matrix (W) 352 to whiten the scaled channel estimate (αH) 344 and produce a whitened channel estimate ($H_w$) 372a. Similarly, the symbol whitener 370 may whiten the MIMO symbol streams 330 using the whitening matrix (W) 352 to produce whitened received symbols ($Y_w$) 374. The max log MAP (MLM) module 348 may receive $H_w$ 372a and $Y_w$ 374 as inputs and produce a first data stream 376 using max log MAP (MLM) processing discussed below. The max log MAP (MLM) module 348 may also use a fixed point scalar (β" here means we may need to calculate two possible different β" for two streams) 378 that is calculated from a turbo decoder scaling calculator 382. The turbo decoder scaling calculator 382 may receive a whitened channel estimate ($H_w$) 372b from a channel whitener 368b. The max log MAP (MLM) module 348 may also receive the modulation types 380 for the symbol streams, (e.g., QPSK, 16QAM, 64QAM), because different streams may have been modulated using different techniques. The first data stream 376 may then be de-rate matched and turbo decoded by the de-rate matching turbo decoder 350 to produce the decoded first stream data 356.

Figure 4:
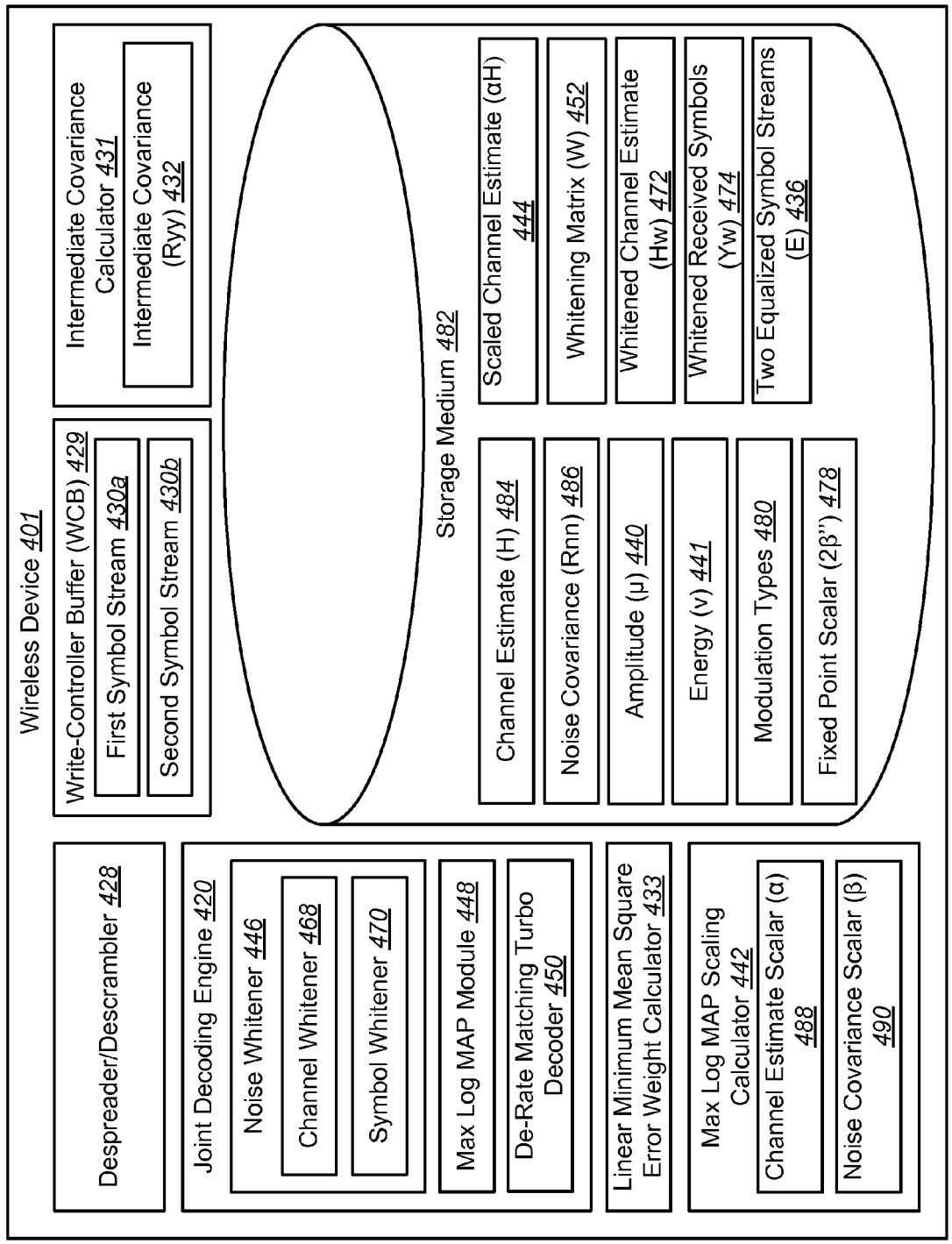
FIG. 4 is a block diagram illustrating a wireless communication device that uses a joint decoding engine.

FIG. 4 is a block diagram illustrating a wireless device 401 that uses a joint decoding engine 420. The wireless device 401 may be a wireless communication device 102 or a base station 104. A despreader/descrambler 428 may receive a chip level MIMO signal and produce a first MIMO symbol stream 430a and a second MIMO symbol stream 430b. The MIMO symbol streams 430 may be stored in a write-controller buffer 429.

The wireless device 401 may also include a storage medium 482 to store various parameters used in the joint decoding process. A channel estimate (H) 484 and a noise covariance (Rnn) 486 may be estimated from the Common Pilot Channel (CPICH). However, since the CPICH may have an unknown power offset to the High Speed-Physical Downlink Shared Channel (HS-PDSCH), a channel estimate scalar (α) 488 and a noise covariance scalar (β) 490 may be calculated by a max log MAP (MLM) scaling calculator 442 according to Equations (9)-(16). An intermediate covariance calculator 431 may calculate an intermediate covariance (Ryy) 432 that may be used to determine α 488 and β 490. This may include calculating two equalized streams (E) 436, and an amplitude (μ) 440 and an energy (v) 441 for received symbols. A linear minimum mean square error weight calculator 433 may also be used to determine α 488 and β 490.

A joint decoding engine 420 may receive a scaled channel estimate (αH) 444, a whitening matrix (W) 452, and a MIMO symbol stream 430 as input. A channel whitener 468 in a noise whitener 446 may whiten the scaled channel estimate (αH) 444 according to Equation (5) to produce a whitened channel estimate ($H_w$) 472. Similarly, a symbol whitener 470 may whiten the MIMO symbol stream 430 according to Equation (4) to produce whitened received symbols ($Y_w$) 474.

A max log MAP (MLM) module 448 may receive the whitened channel estimate ($H_w$) 472 and the whitened received symbols ($Y_w$) 474 and produce a first data stream. The max log MAP (MLM) module 448 may also receive a fixed point scalar 478 (β" that may indicate two β" for two streams) to account for the fixed point effect. The max log MAP (MLM) module 448 may also receive modulation types 480 of the MIMO symbol streams 430. A de-rate matching turbo decoder 450 may perform de-rate matching and turbo decoding on the first data stream output from the max log MAP (MLM) module 448 to produce a decoded first data stream 256.

Figure 5:
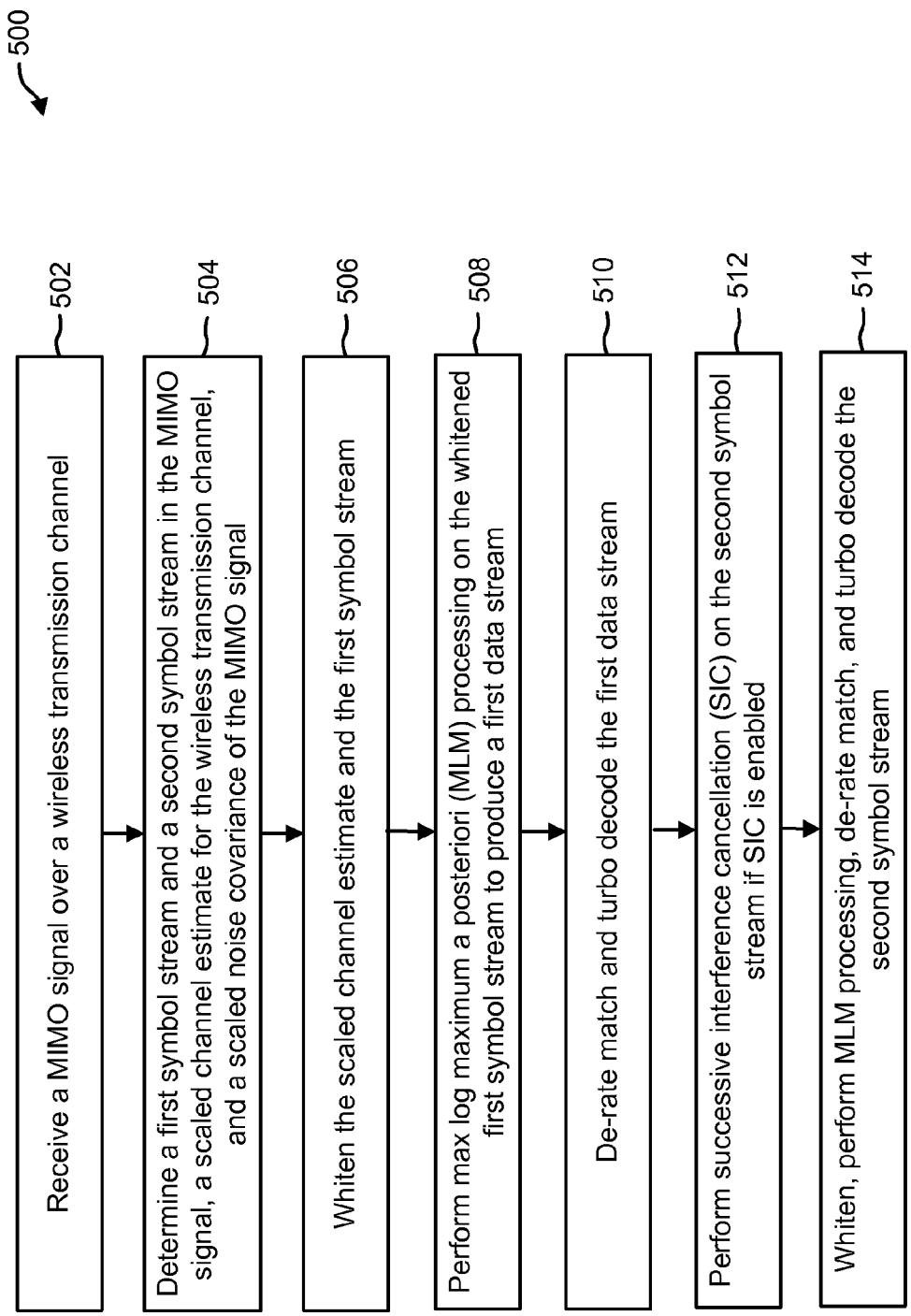
FIG. 5 is a flow diagram illustrating a method for using a joint decoding engine.

FIG. 5 is a flow diagram illustrating a method 500 for using a joint decoding engine 320. The method 500 may be performed in a wireless communication device 102 or a base station 104. The wireless communication device 102 may receive 502 a MIMO signal over a wireless transmission channel. The MIMO signal may be received at the chip level and converted to symbols by a despreader/descrambler. The wireless communication device 102 may also determine 504 a first MIMO symbol stream 230a and a second MIMO symbol stream 230b in the MIMO signal, a channel estimate (H) for the wireless transmission channel, and a noise covariance ($R_{nn}$) of the MIMO signal. The channel estimate (H) may be intended as an estimate of the High Speed-Physical Downlink Shared Channel (HS-PDSCH). Therefore, the channel estimate (H) may be equivalent to a scaled estimate of the Common Pilot Channel (CPICH), i.e., (αH) 244. The wireless communication device 102 may whiten 506 the channel estimate (H) and the first MIMO symbol stream 230a. This may include using a whitening matrix (W) 252 derived from the noise covariance ($R_{nn}$). Like the channel estimate (H), the noise covariance ($R_{nn}$) may be equivalent to a scaled noise covariance ($\beta R_{nn}$) 364 of the Common Pilot Channel (CPICH).

The wireless communication device 102 may perform 508 max log MAP (MLM) processing on the whitened first MIMO symbol stream. This may include determining log likelihood ratios (LLRs) for bits in the whitened first MIMO symbol stream to produce a first data stream as discussed below. The wireless communication device 102 may also de-rate match 510 and turbo decode the first data stream. De-rate matching may include de-puncturing/replacing or expanding/repeating some of the bits in the data stream before turbo decoding, i.e., replacing bits that were punctured, or removed, at the transmitter. This allows a turbo decoder to receive a data stream at an expected data rate. The wireless communication device 102 may also perform 512 successive interference cancellation (SIC) on the second MIMO symbol stream if SIC is enabled. Successive interference cancellation (SIC) may be enabled using any suitable method, e.g., embedding one or more bits in the transmitted data, setting a bit on the device, etc. The wireless communication device 102 may also whiten, perform max log MAP (MLM) processing, de-rate matching, and turbo decoding 514 on the second MIMO symbol stream 230b.

Figure 6:
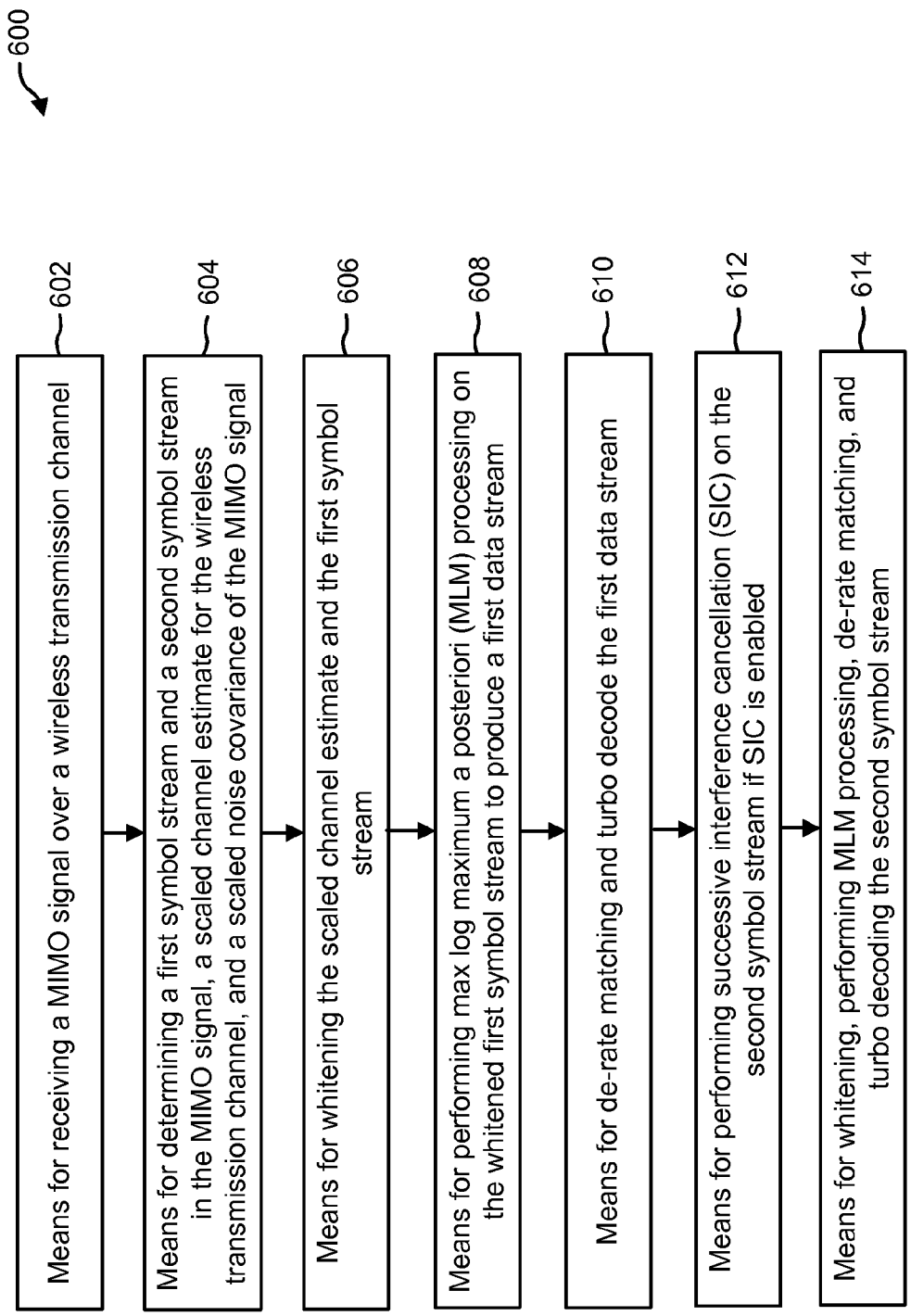
FIG. 6 illustrates means-plus-function blocks corresponding to the method of FIG. 5.

The method 500 of FIG. 5 described above may be performed by various hardware and/or software component(s) and/or module(s) corresponding to the means-plus-function blocks 600 illustrated in FIG. 6. In other words, blocks 502 through 514 illustrated in FIG. 5 correspond to means-plus-function blocks 602 through 614 illustrated in FIG. 6.

Figure 7:
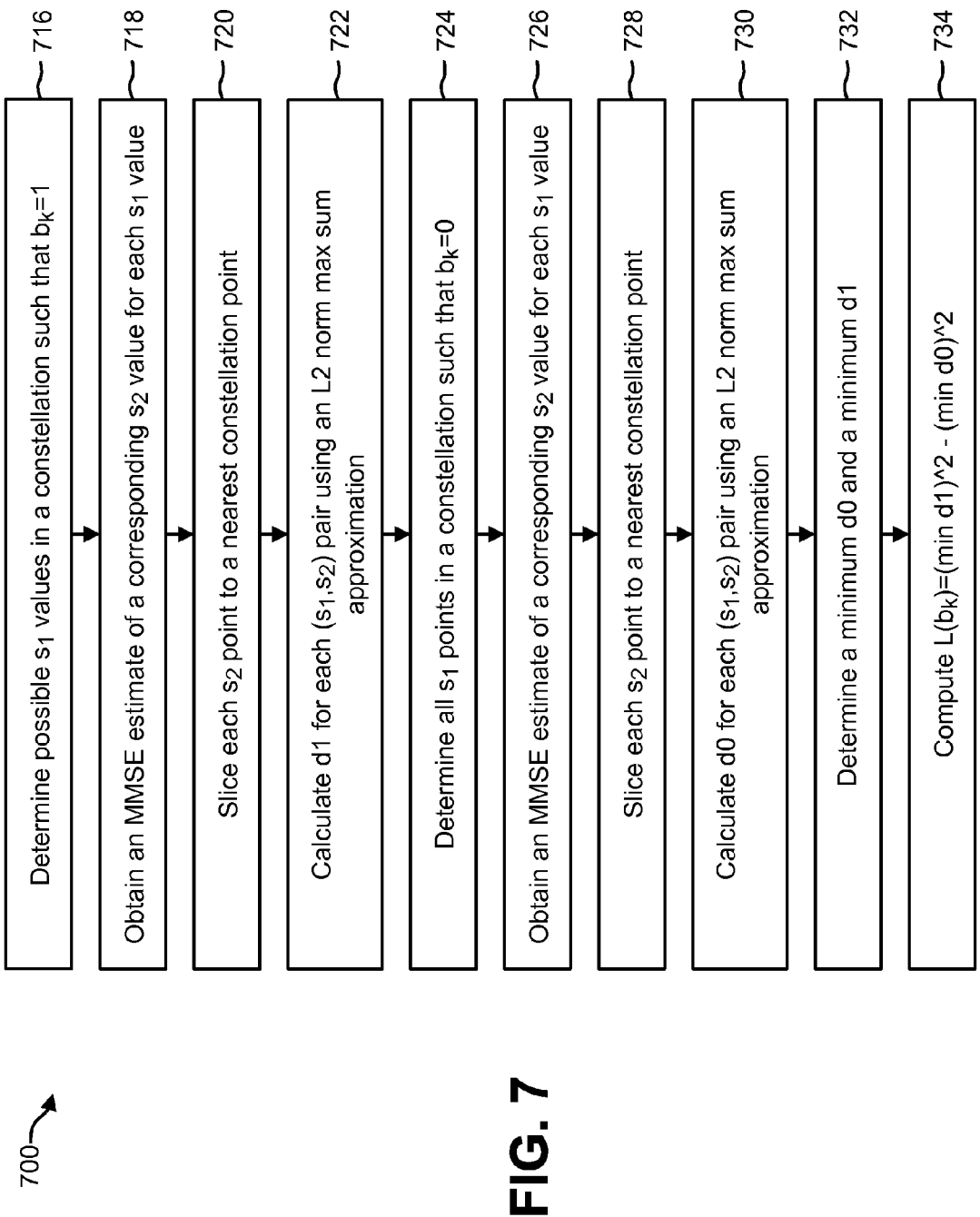
FIG. 7 is a flow diagram illustrating a method for max log maximum a posteriori (MLM) processing.

FIG. 7 is a flow diagram illustrating a method 700 for max log maximum a posteriori (MLM) processing. The method 700 may be performed by a max log MAP (MLM) module 250 in a wireless communication device 102 or a base station 104. Using a MAP algorithm, the LLR of bit $b_k$ may be given by Equation (18):

$$L(b_k) = \log\left(\frac{Pr\{b_k = 0 \mid y\}}{Pr\{b_k = 1 \mid y\}}\right) = \log\left(\frac{\sum_{s:b_k=0} Pr\{y \mid s\}Pr\{s\}}{\sum_{s:b_k=1} Pr\{y \mid s\}Pr\{s\}}\right) \quad (18)$$

Using a maximum likelihood (ML) algorithm, the LLR of bit $b_k$ may be given by Equation (19):

$$L(b_k) = \log\left(\frac{\sum_{s:b_k=0} Pr\{y|s\}}{\sum_{s:b_k=1} Pr\{y|s\}}\right) \quad (19)$$

And, using a max log MAP (MLM) algorithm, the LLR of bit $b_k$ may be approximated by Equation (20):

$$L(b_k) \approx \log\left(\frac{\max_{s:b_k=0} Pr\{y|s\}}{\max_{s:b_k=1} Pr\{y|s\}}\right) \quad (20)$$

Equation (20) may further be simplified with Equation (21):

$$L(b_k) = \min_{s:b_k=1} d^2(s) - \min_{s:b_k=0} d^2(s) \quad (21)$$

where $d(s)=1/\sigma\|y-Hs\|=\|y-Hs\|=\|y-h_1s_1-h_2s_2\|$. Furthermore, $\sigma$ is the noise covariance, similar to Equations (12) and (15). However, after noise whitening, noise may have unit variance, meaning $\sigma$ after noise whitening becomes 1 (so the $1/\sigma$ term may be removed). Therefore, max log MAP (MLM) processing may include solving Equation (21).

To solve Equation (21), assuming $b_k \in s_1$, the MLM module 250 may determine 716 all $s_1$ points in a constellation diagram such that $b_k=1$. The MLM module 250 may also obtain 718 a minimum mean square error (MMSE) estimate of an $s_2$ point that corresponds to each $s_1$ point. The MLM module 250 may also slice 720 each $s_2$ point to a closest constellation point as the new $s_2$ point. In other words, for each s1, the MMSE and slicing indicates how to directly get s2, without searching, i.e., for each s1, we will get a corresponding s2 by MMSE and slicing. The MLM module 250 may also calculate 722 d1 for each ($s_1$, $s_2$) pair using the L2 norm max sum approximation as shown in Equation (22):

$$d = \max_i |z_i| + 0.25\left(\sum_{j \neq i} |z_j|\right) \quad (22)$$

where i and j are indices and z is defined according to Equation (23) for $$s = \begin{bmatrix} s_1 \\ s_2 \end{bmatrix};$$

$$z = \begin{bmatrix} z_1 \\ z_2 \\ z_3 \\ z_4 \end{bmatrix} = \begin{bmatrix} \text{real}(s_1) \\ \text{imag}(s_1) \\ \text{real}(s_2) \\ \text{imag}(s_2) \end{bmatrix} \quad (23)$$

The MLM module 250 may determine 724 all $s_1$ points in the constellation diagram such that $b_k=0$. The MLM module 250 may also obtain 726 a minimum mean square error (MMSE) estimate of an $s_2$ point that corresponds to each $s_1$ point. The MLM module 250 may also slice 728 each $s_2$ point to a closest constellation point as the new $s_2$ point. The MLM module 250 may also calculate 730 d0 for each ($s_1$, $s_2$) pair using the L2 norm approximation as shown in Equation (22) where i and j are indices and z is defined according to Equation (23) for $$s = \begin{bmatrix} s_1 \\ s_2 \end{bmatrix}.$$

The MLM module 250 may then determine 732 a minimum d0 and a minimum d1. The MLM module 250 may then compute 734 Equation (24):

$$L(b_k) = (\min d1)^2 - (\min d0)^2 \quad (24)$$

Basically, using the norm approximation as shown in Equation (22) may calculate $\|y-h_1s_1-h_2s_2\|$ by max sum approximation instead of $\|y-h_1s_1-h_2s_2\|^2$. Thus, squaring is only performed at the final LLR calculation stage, i.e., once for all possible constellations. This results in a smaller dynamic range that uses less bit-width and memory as well as lower computational complexity in metric calculation state, which may be performed faster.

For example, if $s_1$ uses 64QAM, then there are a total of 64 possible constellation points, where 32 of them will have $b_k=1$. So an MLM module 250 may try all possible 32 constellation hypothesis where $b_k=1$. For each hypothesis of $s_1$, the MLM module 250 may obtain (by MMSE and slicing) a corresponding $s_2$. Then the MLM module 250 may get 32 $d^2(s)$ terms, each corresponding to one ($s_1$, $s_2$) pair. Then the MLM module 250 may get min of 32 terms, which is the first term in Equation (21). A similar method may be used to get the second term in Equation (21), however, for the second term we will try the other 32 $s_1$ constellations where $b_k=0$.

Figure 8:
FIG. 8 illustrates means-plus-function blocks corresponding to the method of FIG. 7.

The method 700 of FIG. 7 described above may be performed by various hardware and/or software component(s) and/or module(s) corresponding to the means-plus-function blocks 800 illustrated in FIG. 8. In other words, blocks 716 through 734 illustrated in FIG. 7 correspond to means-plus-function blocks 816 through 834 illustrated in FIG. 8.

Figure 9:
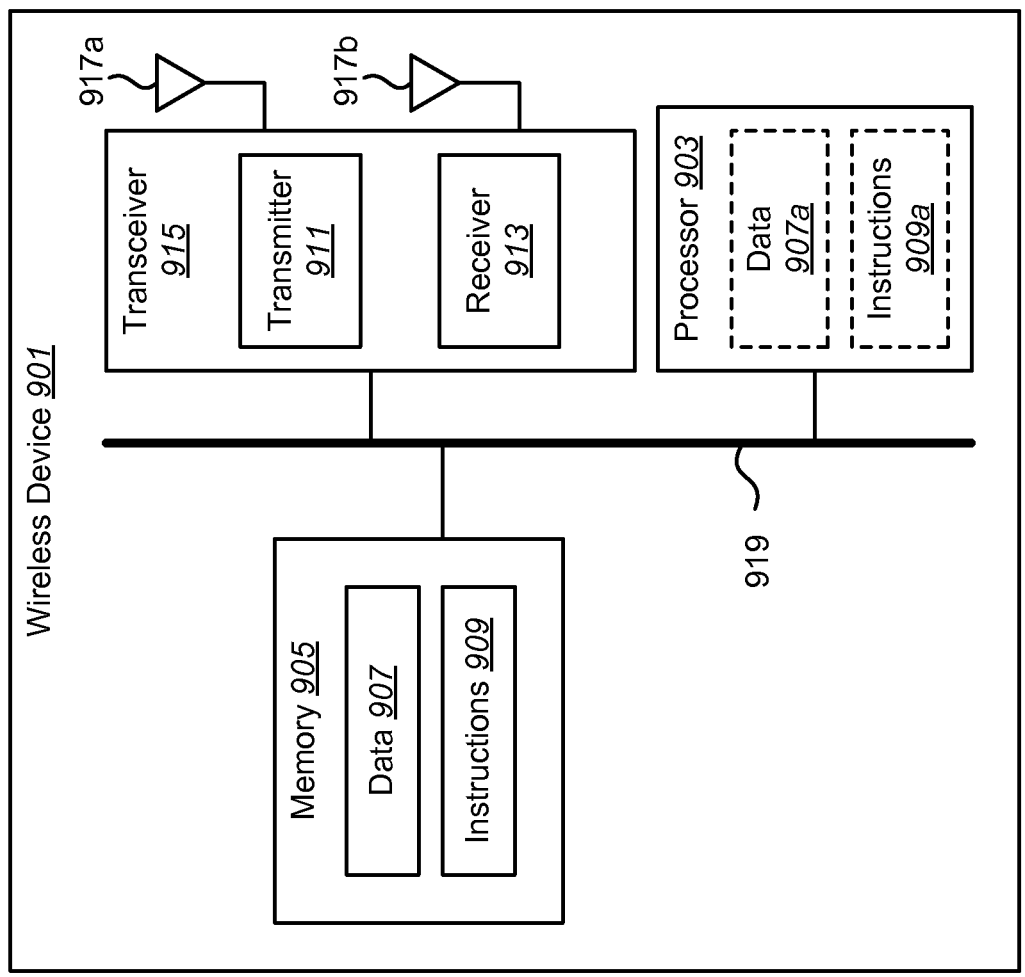
FIG. 9 illustrates certain components that may be included within a wireless device.

FIG. 9 illustrates certain components that may be included within a wireless device 901. The wireless device 901 may be a wireless communication device 102 or a base station 104.

The wireless device 901 includes a processor 903. The processor 903 may be a general purpose single-chip or multi-chip microprocessor (e.g., an ARM), a special purpose microprocessor (e.g., a digital signal processor (DSP)), a microcontroller, a programmable gate array, etc. The processor 903 may be referred to as a central processing unit (CPU). Although just a single processor 903 is shown in the wireless device 901 of FIG. 9, in an alternative configuration, a combination of processors (e.g., an ARM and DSP) could be used.

The wireless device 901 also includes memory 905. The memory 905 may be any electronic component capable of storing electronic information. The memory 905 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 907 and instructions 909 may be stored in the memory 905. The instructions 909 may be executable by the processor 903 to implement the methods disclosed herein. Executing the instructions 909 may involve the use of the data 907 that is stored in the memory 905. When the processor 903 executes the instructions 907, various portions of the instructions 909a may be loaded onto the processor 903, and various pieces of data 907a may be loaded onto the processor 903.

The wireless device 901 may also include a transmitter 911 and a receiver 913 to allow transmission and reception of signals between the wireless device 901 and a remote location. The transmitter 911 and receiver 913 may be collectively referred to as a transceiver 915. An antenna 917 may be electrically coupled to the transceiver 915. The wireless device 901 may also include (not shown) multiple transmitters, multiple receivers, multiple transceivers and/or multiple antenna.

The various components of the wireless device 901 may be coupled together by one or more buses, which may include a power bus, a control signal bus, a status signal bus, a data bus, etc. For the sake of clarity, the various buses are illustrated in FIG. 9 as a bus system 919.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement (s). For example, the terms "instructions" and "code" may refer to one or more programs, routines, sub-routines, functions, procedures, etc. "Instructions" and "code" may comprise a single computer-readable statement or many computer-readable statements.

The functions described herein may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 5 and 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for using a joint decoding engine in a wireless device, comprising:
    determining a first symbol stream and a second symbol stream in a received multiple input multiple output (MIMO) signal, a scaled channel estimate for a wireless transmission channel, and a scaled noise covariance of the MIMO signal;
    whitening the scaled channel estimate and the first symbol stream;

performing max log maximum a posteriori (MLM) processing on the whitened first symbol stream to produce a first data stream;

de-rate matching and turbo decoding the first data stream to produce a decoded first data stream, wherein de-rate matching comprises replacing bits in the first data stream before turbo decoding;

performing hard successive interference cancellation (SIC) or soft SIC on the second symbol stream if SIC is enabled; and whitening, performing max log maximum a posteriori (MLM) processing, de-rate matching, and turbo decoding the second symbol stream to produce a decoded second data stream.

2. The method of claim 1, wherein successive interference cancellation (SIC) comprises encoding the decoded first data stream to reproduce the first data stream and using the first data stream to zero out one column of the scaled channel estimate.

3. The method of claim 1, further comprising:
determining scaling factors for a channel estimate and a noise covariance in the received multiple input multiple output (MIMO) signal based on amplitude and energy of the first symbol stream and the second symbol stream; and
scaling the channel estimate and the noise covariance using the scaling factors to produce the scaled channel estimate and the scaled noise covariance.

4. The method of claim 1, wherein the determining the first symbol stream and the second symbol stream from the received multiple input multiple output (MIMO) signal comprises despreading or descrambling the received MIMO signal to produce the first symbol stream and the second symbol stream.

5. The method of claim 1, wherein the whitening comprises:
determining a whitening matrix based on the scaled noise covariance of the multiple input multiple output (MIMO) signal; and
whitening the scaled channel estimate and the first symbol stream using the whitening matrix.

6. The method of claim 1, wherein max log maximum a posteriori (MLM) processing comprises:
if bit $b_k$ is in $s_1$, where $s_1$ is a symbol in the first symbol stream:
determining possible $s_1$ values as constellation points such that $b_k=1$;
for each possible $s_1$ value, obtaining a minimum mean square error (MMSE) estimate of a corresponding $s_2$, where $s_2$ is a symbol in the second symbol stream and determining possible $s_2$ values as the MMSE estimates of $s_2$ sliced to a nearest constellation point;
estimating $d_1 = \|y - h_1 s_1 - h_2 s_2\|$ using an L2 norm max sum approximation for each $(s_1, s_2)$ pair, where y is the received multiple input multiple output (MIMO) signal, $h_1$ is a first column in the scaled channel estimate, and $h_2$ is a second column in the scaled channel estimate;
determining a minimum $d_1$ value, $\min(d_1)$;
determining possible $s_1$ values as constellation points such that $b_k=0$;
for each possible $s_1$ value, obtaining a minimum mean square error (MMSE) estimate of a corresponding $s_2$ and determining possible $s_2$ values as the MMSE estimates of $s_2$ sliced to a nearest constellation point;
estimating $d_0 = \|y - h_1 s_1 - h_2 s_2\|$ using an L2 norm max sum approximation for each $(s_1, s_2)$ pair;
determining a minimum $d_0$ value, $\min(d_0)$; and
determining the log likelihood ratio (LLR) of $b_k$, $L(b_k)$, as $L(b_k) = (\min(d_1))^2 - (\min(d_0))^2$.

7. The method of claim 6, wherein max log maximum a posteriori (MLM) processing further comprises:
if bit $b_k$ is in $s_2$:
determining possible $s_2$ values as constellation points such that $b_k=1$;
for each possible $s_2$ value, obtaining a minimum mean square error (MMSE) estimate of a corresponding $s_1$, and determining possible $s_1$ values as the MMSE estimates of $s_1$ sliced to a nearest constellation point;
estimating $d_1 = \|y - h_1 s_1 - h_2 s_2\|$ using an L2 norm max sum approximation for each $(s_1, s_2)$ pair;
determining a minimum $d_1$ value, $\min(d_1)$;
determining possible $s_2$ values as constellation points such that $b_k=0$;
for each possible $s_2$ value, obtaining a minimum mean square error (MMSE) estimate of a corresponding $s_1$ and determining possible $s_1$ values as the MMSE estimates of $s_1$ sliced to a nearest constellation point;
estimating $d_0 = \|y - h_1 s_1 - h_2 s_2\|$ using an L2 norm max sum approximation for each $(s_1, s_2)$ pair;
determining a minimum $d_0$ value, $\min(d_0)$; and
determining the log likelihood ratio (LLR) of $b_k$, $L(b_k)$, as $L(b_k) = (mm(d_1))^2 - (\min(d_0))^2$.

8. The method of claim 7, wherein the estimating $d_1$ and $d_0$ using the L2 norm max sum approximation comprises:

$$\text{defining } z = \begin{bmatrix} z_1 \\ z_2 \\ z_3 \\ z_4 \end{bmatrix} = \begin{bmatrix} \text{real}(s_1) \\ \text{imag}(s_1) \\ \text{real}(s_2) \\ \text{imag}(s_2) \end{bmatrix}; \text{ and}$$

determining d as $$d = \max_i |z_i| + 0.25 \left( \sum_{j \neq i} |z_j| \right)$$

where i and j are incrementing indices.

9. The method of claim 1, wherein the wireless device operates using High Speed Downlink Packet Access (HSDPA).

10. A wireless device that uses a joint decoding engine, comprising:
a processor;
memory in electronic communication with the processor;
instructions stored in the memory, the instructions being executable by the processor to:
determine a first symbol stream and a second symbol stream in a received multiple input multiple output (MIMO) signal, a scaled channel estimate for a wireless transmission channel, and a scaled noise covariance of the MIMO signal;
whiten the scaled channel estimate and the first symbol stream;
perform max log maximum a posteriori (MLM) processing on the whitened first symbol stream to produce a first data stream; and
de-rate match and turbo decode the first data stream to produce a decoded first data stream, wherein de-rate match comprises replacing bits in the first data stream before turbo decoding;

perform hard successive interference cancellation (SIC) or soft SIC on the second symbol stream if SIC is enabled; and whiten, perform max log maximum a posteriori (MLM) processing, de-rate match, and turbo decode the second symbol stream to produce a decoded second data stream.

11. The wireless device of claim 10, wherein the instructions executable to perform successive interference cancellation (SIC) comprise instructions executable to encode the decoded first data stream to reproduce the first data stream and use the first data stream to zero out one column of the scaled channel estimate.

12. The wireless device of claim 10, further comprising instructions executable to:
determine scaling factors for a channel estimate and a noise covariance in the received multiple input multiple output (MIMO) signal based on amplitude and energy of the first symbol stream and the second symbol stream; and
scale the channel estimate and the noise covariance using the scaling factors to produce the scaled channel estimate and the scaled noise covariance.

13. The wireless device of claim 10, wherein the instructions executable to determine the first symbol stream and the second symbol stream from the received multiple input multiple output (MIMO) signal comprise instructions executable to despread or descramble the received MIMO signal to produce the first symbol stream and the second symbol stream.

14. The wireless device of claim 10, wherein the instructions executable to whiten comprise instructions executable to:
determine a whitening matrix based on the scaled noise covariance of the multiple input multiple output (MIMO) signal; and
whiten the scaled channel estimate and the first symbol stream using the whitening matrix.

15. The wireless device of claim 10, wherein instructions executable to perform max log maximum a posteriori (MLM) processing comprise instructions executable to:
if bit $b_k$ is in $s_1$, where $s_1$ is a symbol in the first symbol stream:
determine possible $s_1$ values as constellation points such that $b_k=1$;
for each possible $s_1$ value, obtain a minimum mean square error (MMSE) estimate of a corresponding $s_2$, where $s_2$ is a symbol in the second symbol stream and determine possible $s_2$ values as the MMSE estimates of $s_2$ sliced to a nearest constellation point;
estimate $d_1 = \|y - h_1 s_1 - h_2 s_2\|$ using an L2 norm max sum approximation for each $(s_1, s_2)$ pair, where y is the received multiple input multiple output (MIMO) signal, $h_1$ is a first column in the scaled channel estimate, and $h_2$ is a second column in the scaled channel estimate;
determine a minimum $d_1$ value, $\min(d_1)$;
determine possible $s_1$ values as constellation points such that $b_k=0$;
for each possible $s_1$ value, obtain a minimum mean square error (MMSE) estimate of a corresponding $s_2$ and determine possible $s_2$ values as the MMSE estimates of $s_2$ sliced to a nearest constellation point;
estimate $d_0 = \|y - h_1 s_1 - h_2 s_2\|$ using the L2 norm max sum approximation for each $(s_1, s_2)$ pair;
determine a minimum $d_0$ value, $\min(d_0)$; and
determine the log likelihood ratio (LLR) of $b_k$, $L(b_k)$, as $L(b_k) = (\min(d_1))^2 - (\mathrm{mm}(d_0))^2$.

16. The wireless device of claim 15, wherein instructions executable to perform max log maximum a posteriori (MLM) processing further comprise instructions executable to:
if bit $b_k$ is in $s_2$:
determine possible $s_2$ values as constellation points such that $b_k=1$;
for each possible $s_2$ value, obtain a minimum mean square error (MMSE) estimate of a corresponding $s_1$, and determine possible $s_1$ values as the MMSE estimates of $s_1$ sliced to a nearest constellation point;
estimate $d_1 = \|y - h_1 s_1 - h_2 s_2\|$ using the L2 norm max sum approximation for each $(s_1, s_2)$ pair;
determine a minimum $d_1$ value, $\min(d_1)$;
determine possible $s_2$ values as constellation points such that $b_k=0$;
for each possible $s_2$ value, obtain a minimum mean square error (MMSE) estimate of a corresponding $s_1$ and determine possible $s_1$ values as the MMSE estimates of $s_1$ sliced to a nearest constellation point;
estimate $d_0 = \|y - h_1 s_1 - h_2 s_2\|$ using the L2 norm max sum approximation for each $(s_1, s_2)$ pair;
determine a minimum $d_0$ value, $\min(d_0)$; and
determine the log likelihood ratio (LLR) of $b_k$, $L(b_k)$, as $L(b_k) = (\min(d_1))^2 - (\min(d_0))^2$.

17. The wireless device of claim 16, wherein instructions executable to estimate $d_1$ and $d_0$ using the L2 norm max sum approximation comprise instructions executable to:

$$\text{define } z = \begin{bmatrix} z_1 \\ z_2 \\ z_3 \\ z_4 \end{bmatrix} = \begin{bmatrix} \text{real}(s_1) \\ \text{imag}(s_1) \\ \text{real}(s_2) \\ \text{imag}(s_2) \end{bmatrix}; \text{ and}$$

determine d as $$d = \max_i |z_i| + 0.25 \left( \sum_{j \neq i} |z_j| \right)$$

where i and j are incrementing indices.

18. The wireless device of claim 10, wherein the wireless device operates using High Speed Downlink Packet Access (HSDPA).

19. A wireless device that uses a joint decoding engine, comprising:
means for determining a first symbol stream and a second symbol stream in a received multiple input multiple output (MIMO) signal, a scaled channel estimate for a wireless transmission channel, and a scaled noise covariance of the MIMO signal;
means for whitening the scaled channel estimate and the first symbol stream;
means for performing max log maximum a posteriori (MLM) processing on the whitened first symbol stream to produce a first data stream;
means for de-rate matching and turbo decoding the first data stream to produce a decoded first data stream, wherein de-rate matching comprises replacing bits in the first data stream before turbo decoding;
means for performing hard successive interference cancellation (SIC) or soft SIC on the second symbol stream if SIC is enabled; and
means for whitening, performing max log maximum a posteriori (MLM) processing, de-rate matching, and turbo decoding the second symbol stream to produce a decoded second data stream.

20. The wireless device of claim 19, wherein the means for performing successive interference cancellation (SIC) comprise means for encoding the decoded first data stream to reproduce the first data stream and using the first data stream to zero out one column of the scaled channel estimate.

21. The wireless device of claim 19, further comprising:
means for determining scaling factors for a channel estimate and a noise covariance in the received multiple input multiple output (MIMO) signal based on amplitude and energy of the first symbol stream and the second symbol stream; and
means for scaling the channel estimate and the noise covariance using the scaling factors to produce the scaled channel estimate and the scaled noise covariance.

22. The wireless device of claim 19, wherein the means for determining the first symbol stream and the second symbol stream from the received multiple input multiple output (MIMO) signal comprise means for despreading or descrambling the received MIMO signal to produce the first symbol stream and the second symbol stream.

23. A computer-program product for using a joint decoding engine, the computer-program product comprising a non-transitory computer-readable medium having instructions thereon, the instructions comprising:
code for determining a first symbol stream and a second symbol stream in a received multiple input multiple output (MIMO) signal, a scaled channel estimate for a wireless transmission channel, and a scaled noise covariance of the MIMO signal;
code for whitening the scaled channel estimate and the first symbol stream;
code for performing max log maximum a posteriori (MLM) processing on the whitened first symbol stream to produce a first data stream;
code for de-rate matching and turbo decoding the first data stream to produce a decoded first data stream, wherein de-rate matching comprises replacing bits in the first data stream before turbo decoding;
code for performing hard successive interference cancellation (SIC) or soft SIC on the second symbol stream if SIC is enabled; and
code for whitening, performing max log maximum a posteriori (MLM) processing, de-rate matching, and turbo decoding the second symbol stream to produce a decoded second data stream.

24. The computer-program product of claim 23, wherein the code for performing successive interference cancellation (SIC) comprises code for encoding the decoded first data stream to reproduce the first data stream and using the first data stream to zero out one column of the scaled channel estimate.

25. The computer-program product of claim 23, further comprising:
code for determining scaling factors for a channel estimate and a noise covariance in the received multiple input multiple output (MIMO) signal based on amplitude and energy of the first symbol stream and the second symbol stream; and
code for scaling the channel estimate and the noise covariance using the scaling factors to produce the scaled channel estimate and the scaled noise covariance.

26. The computer-program product of claim 23, wherein the code for determining the first symbol stream and the second symbol stream from the received multiple input multiple output (MIMO) signal comprises code for despreading or descrambling the received MIMO signal to produce the first symbol stream and the second symbol stream.

* * * * *